(12) United States Patent
Deutsch et al.

(10) Patent No.: US 6,219,415 B1
(45) Date of Patent: Apr. 17, 2001

(54) CALL HOLD STATE NOTIFICATION ACROSS A COMMUNICATIONS NETWORK

(75) Inventors: Douglas Anthony Deutsch, Aurora; David B. Smith, Hinsdale; Donald Robert Rueckheim, Lockport, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/111,841

(22) Filed: Jul. 8, 1998

(51) Int. Cl.[7] .................................................. H04M 3/42
(52) U.S. Cl. .......................... 379/215; 379/162; 379/393
(58) Field of Search .................................. 379/215, 393, 379/201, 109

(56) References Cited

U.S. PATENT DOCUMENTS

| | | | | |
|---|---|---|---|---|
| 5,668,861 | * | 9/1997 | Watts ................................ | 379/208 X |
| 5,764,746 | * | 6/1998 | Reicholt ............................ | 379/162 X |
| 5,875,231 | * | 2/1999 | Farfan et al. .................... | 379/393 X |
| 6,031,905 | * | 2/2000 | Furman et al. .................. | 379/201 |
| 6,118,861 | * | 12/2000 | Gutzmann et al. .............. | 379/215 |

* cited by examiner

*Primary Examiner*—Creighton Smith
(74) *Attorney, Agent, or Firm*—Duft, Graziano & Forest, P.C.

(57) ABSTRACT

The call hold state notification system functions to provide an indication to the parties presently served by the existing call connection that the original hold state has been terminated. This is accomplished by enabling both parties (multiple parties on a n-way call) to a call connection to place their respective call termination on hold to serve another call or to perform some other task without having to physically monitor the call connection. When any party to the call connection removes the hold state at their respective telephone station set, the remaining parties to the call connection who have a hold state active at their termination receive a notification of the reconnection of the party to the call connection. Optionally, the returning party also receives a notification that the call connection is in an on hold state at the other end of the call connection and that party is being advised of the termination of the held state by the returning party.

16 Claims, 4 Drawing Sheets

CALL HOLD STATE NOTIFICATION ACROSS A COMMUNICATIONS NETWORK

FIELD OF THE INVENTION

This invention relates to communications systems and, in particular, to a method and apparatus that provides a notification to all parties on an existing call connection of changes in the hold state or participation in the call connection initiated by any party to the call connection.

PROBLEM

It is a problem in the field of voice communications that when an existing call is placed on hold by a first party on the call connection, the held party must remain on the line to monitor the held state of the call connection. If the held party places their end of the call connection on hold, the first party is not aware of this status when they return to the call connection and likely believes that the call connection has been dropped. In addition, the held party receives no notification that the first party has returned to the call connection and they must now themselves return to this call connection to reinitiate the communication with the first party.

Therefore, the use of the hold function in a typical two-way communication connection can be frustrating to the party placed on hold, since they are captive to the call connection and must remain idle for the duration of the hold condition. The extension of this problem to multi-party conferences simply compounds the problem, since it is difficult to coordinate the present hold state of the various parties and be aware of who is present on the call connection unless the previously held party announces their return to the call connection. Furthermore, if the held party drops from the call connection, the other participants in the call connection are unaware of the departure of this individual. There is presently no system that addresses these problems.

SOLUTION

The above described problems are solved and a technical advance achieved by the present system for call hold state notification across a communications network (termed "call hold state notification system" herein) that functions to provide an indication to the parties presently served by the existing call connection that the original hold state of a call participant has been terminated or that the call participant has dropped from the call connection. This is accomplished by enabling both parties (multiple parties on a n-way call) to a call connection to place their respective call termination on hold to serve another call or to perform some other task without having to physically monitor the call connection. When any party to the call connection removes the hold state at their respective terminal device, the remaining parties to the call connection, including those who have a hold state active at their termination, receive a notification of the reconnection of the party to the call connection. Optionally, the returning party also receives a notification that the call connection is in an on hold state at the other end of the call connection and that party is being advised of the termination of the held state by the returning party. Furthermore, this feature can be used to alert the participants to a call connection that a call participant has dropped from the call connection.

The held state determination is performed by the communications system in the communications network that serves the party that has placed the call connection on hold. The information regarding the held state of the various parties is typically communicated out-of-band among the various communications systems in the communications network that serve the call connection. The alert to a holding party that another party to the call connection has reconnected to the call can be an inband audible tone, a signal that generates a visual output at the terminal device, and the like.

Furthermore, the use of this feature is extensible to data communications connections, multi-media connections, as well as the use of various communications network architectures, including the Internet, Public Switched Telephone Network (PSTN), inter-exchange carriers, and the like.

DETAILED DESCRIPTION

Communications Network with Call Hold State Notification System

Figure 1:
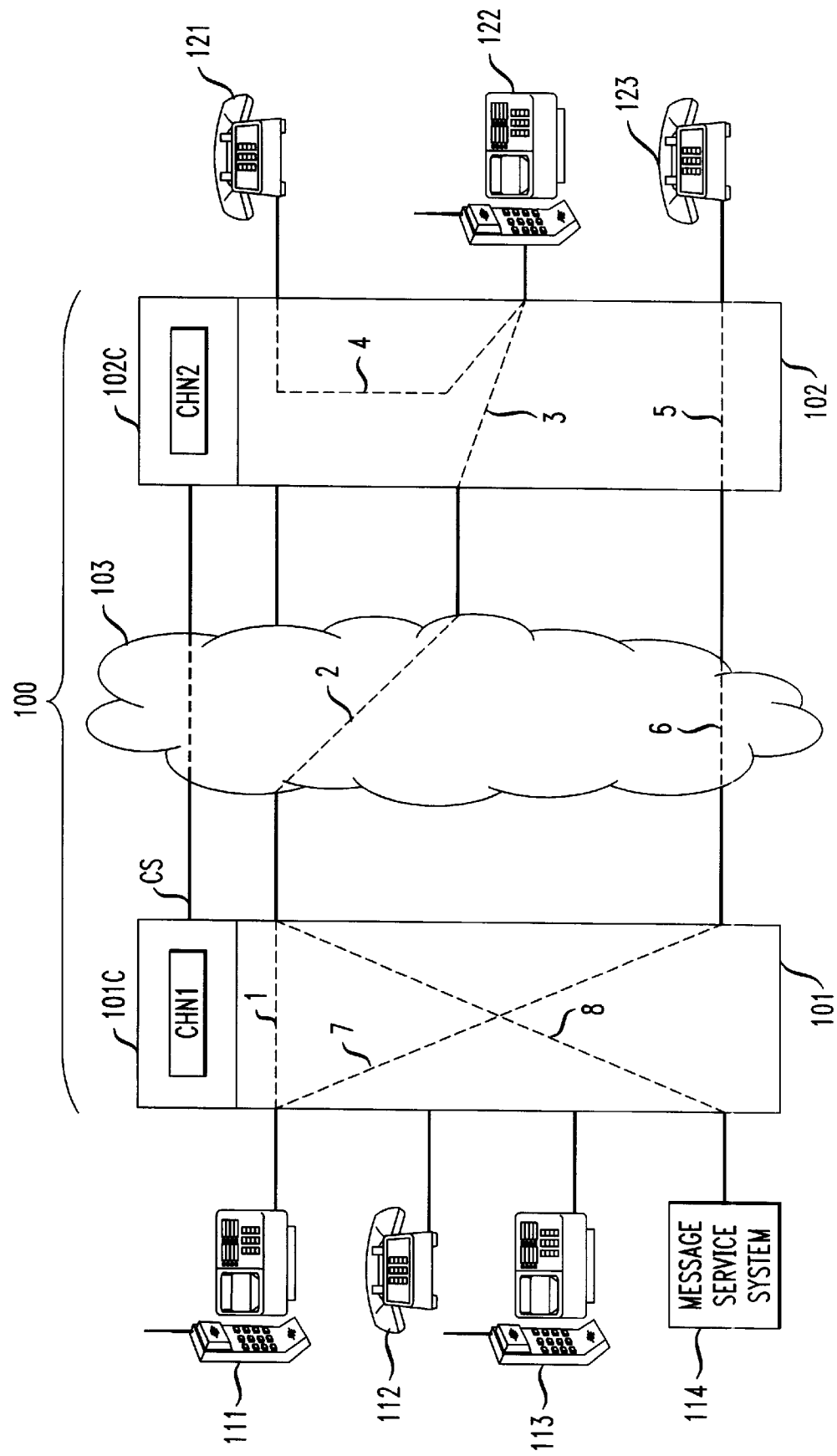
FIG. 1 illustrates in block diagram form the architecture of a typical communications network that is equipped with the present call hold state notification system.
Figure 2:
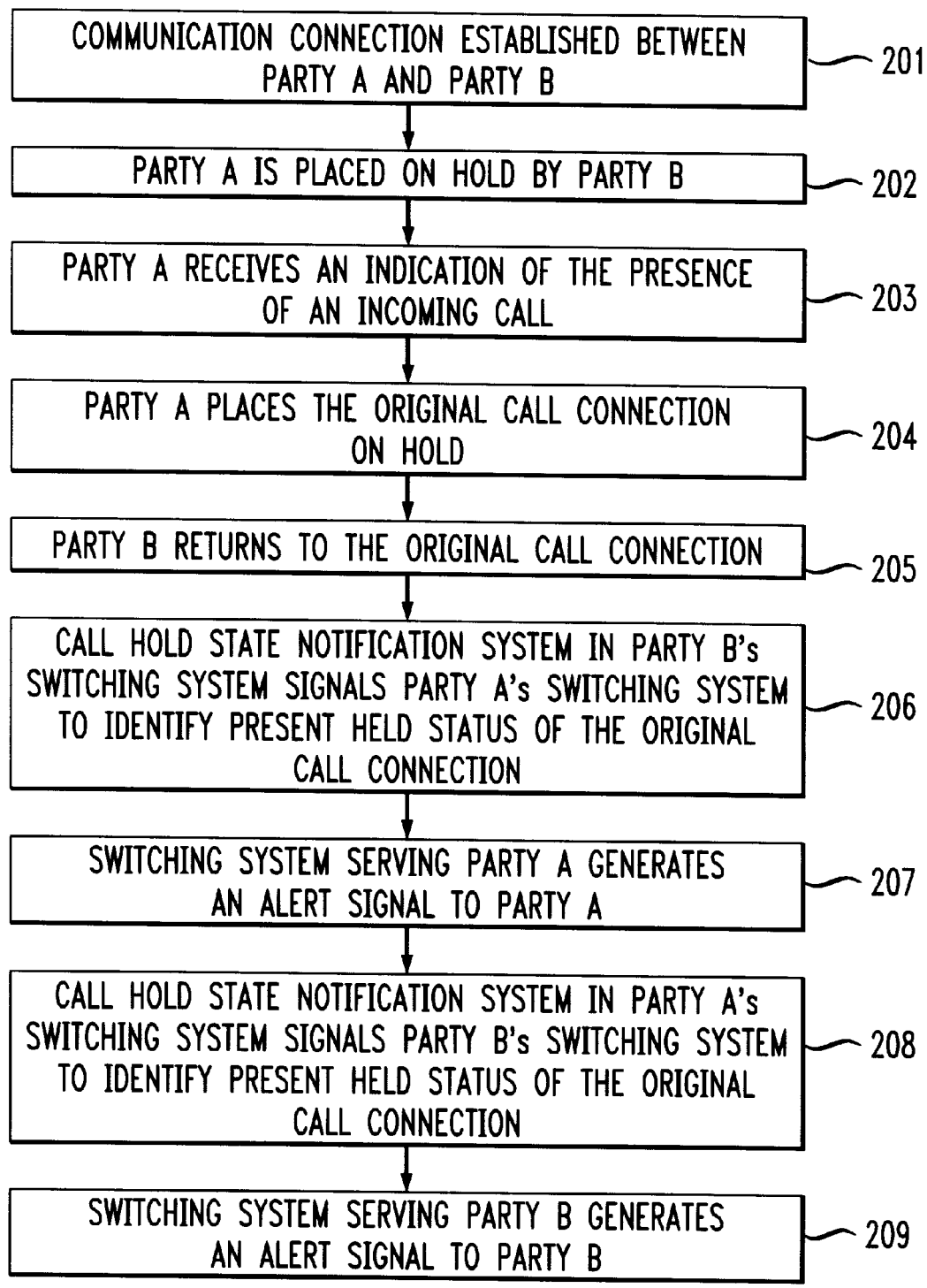
FIG. 2 illustrates in flow diagram form the operation of the present call hold state notification system in a typical communications network.

FIG. 1 illustrates in block diagram form the architecture of a typical communications network that is equipped with the present call hold state notification system while FIG. 2 illustrates in flow diagram form the operation of the present call hold state notification system in that communications network. In particular, the communications network comprises a traditional voice communications network that includes a plurality of local communications systems 101–102, such as telephone switching systems that are part of the Public Switched Telephone Network (PSTN) 100 and are interconnected via trunk circuits to an Interexchange Carrier System (IXC) 103. Each of the communications systems 101, 102 serve a plurality of terminal devices and the communications systems 101, 102 may be interconnected via an out of band signaling link CS through the Interexchange Carrier System (IXC) 103, using the well known SS7 signaling protocol. The operation of such a communications network is well known and is not described in detail herein. The communications systems 101, 102 provide a set of features and services to the terminal devices that they serve, including a call hold service wherein the communications systems 101, 102 implement the call hold function for the associated terminal devices in response to control signals that are received from the terminal devices. In addition, the communications systems 101, 102 are both equipped with the call hold state notification systems CHN1, CHN2, that are operational in the controllers 101C, 102C of the respective communications systems 101, 102.

Call Hold Notification Example

In order to illustrate the operation of the present call hold state notification system, an example of a typical call connection is described, in flow diagram form in FIG. 2, with respect to the system architecture of FIG. 1. In particular, at step 201, a communication connection is established between Party A, located at terminal device 111 (such as a telephone station set), and Party B, located at terminal device 122. This is accomplished for example by Party A at terminal device 111 going off hook and dialing the telephone number of Party B located at terminal device 122. In response to the dialed digits, the controller 101C of communications system 101 causes a call connection to be extended over path 1 to the Interexchange Carrier System 103, which, in response to control signals received from controller 101C over control channel CS, extends this call connection over path 2 to communications system 102. The control signals originated by the controller 101C are propagated by the Interexchange Carrier System 103 to the controller 102C of communications system 102. The controller 102C responds to the received control signals by further extending the call connection over path 3 to the terminal device 122 of Party B.

During this call connection, Party A is placed on hold by Party B at step 202 so that Party B can initiate another telephone call to for example Party D, located at terminal device 121, over path 4 or to perform some action that necessitates the interruption of the communication between Party A and Party B. This is accomplished by Party B operating terminal device 122 to signal controller 102C of communications system 102 to activate the call hold function. The controller 102C implements the call hold function, placing the call connection from terminal device 111 over paths 1 and 2 in an active but noncommunicating condition, thereby freeing terminal device 122 to originate and receive additional call connections. Assume that while on hold, Party A receives an indication at terminal device 111 at step 203 from communications system 101 of the presence of an incoming call that is directed to Party A. Assume that this new incoming telephone call (path segments 5–7) is from Party C, located at terminal device 123 and Party A wishes to answer the incoming call while still on hold on the original call connection. To receive the incoming call from Party C, Party A at step 204 activates terminal device 111 to signal the controller 101C of communications system 101 to place the original call connection with Party B on hold and thereby enable Party A to answer the incoming call from Party C. As a result, the original call connection between Party A and Party B is in an on hold state in both communications systems 101, 102 that serve Party A and Party B, respectively.

If Party A is placed on hold by Party B, and subsequently Party A places their end of the original call connection on hold, Party B can optionally be notified at step 205. This enables Party B to continue with their second communication connection, knowing that Party A is not waiting for them. When either Party returns to the original call connection, a notification to the other Party or Parties to the call connection should be provided, indicating that a Party that was on hold has returned to the call connection and is available to continue with the communications.

When Party B returns to the original call connection at step 206 by operating terminal device 122 to signal controller 102C to release the call hold condition on the original call connection and restore the connection to terminal device 122 via path 3, Party A is not present because Party A is communicating with Party C on the second call connection. In order to make Party A aware of the return of Party B to the original call connection, the present call hold state notification system CHN2 at step 207 generates an alert signal to identify the present held status of the original call connection. In particular, the communications system 102 that serves Party B activates the call hold state notification system CHN2 to transmit an indication to the controller 101C of communications system 101 that serves Party A to indicate the return to the original call connection by Party B. The controller 101C of communications system 101 serving Party A, in response of receipt of this indication from the call hold state notification system CHN2, generates an alert signal at step 208 and transmits it to communication system 102 at step 209 to identify the present call hold status of the original call connection. The communication system 102 at step 210 generates an alert to Party B to indicate theat Party A has reconnected to the original call connection. The message exchange between the two communications systems 101, 102 can be accomplished by out-of-band signaling, such as the SS7 protocol, or by means of in-band signaling on the original call connection. The call hold state notification system CHN2.

If the Party A is equipped with a feature rich communication device 111, then there are a number of call handling options that are available at this juncture. Party A may drop the call connection to Party C and return to the original call connection with party B. Alternatively, Party A can place the call connection with Party C on hold, while returning to the original call connection with Party B. Party A can also drop or conference the call connection with Party B or can send the call connection to a message system 114, such as voice mail, over path 8. These options enable Party A to manage the call connection in response to changing circumstances occasioned by the receipt of the new call connection from Party C.

In the processing of the change of hold state of the call connection by Party B, the call hold state notification system CHN1 resident in the controller 101C of communications system 101 can produce an indication that can be provided to Party B when Party B returns to the original call connection to indicate that Party A has placed the original call connection on hold. This is accomplished by the call hold state notification system CHN1 resident in communications system 101, in response to the indication received from call hold state notification system CHN2 of communications system 102 that Party B has reconnected to the original call connection, transmitting an indication to broadcasting a prerecorded message on the original call connection to Party B to inform Party B of the present hold state of the original call connection due to Party A's actions. At the conclusion of the prerecorded message, Party B can be presented with a number of options: remain on hold, camp-on, redirect to a message service, redirect to an attendant.

ISP Communications Network with Call Hold State Notification System

Figure 3:
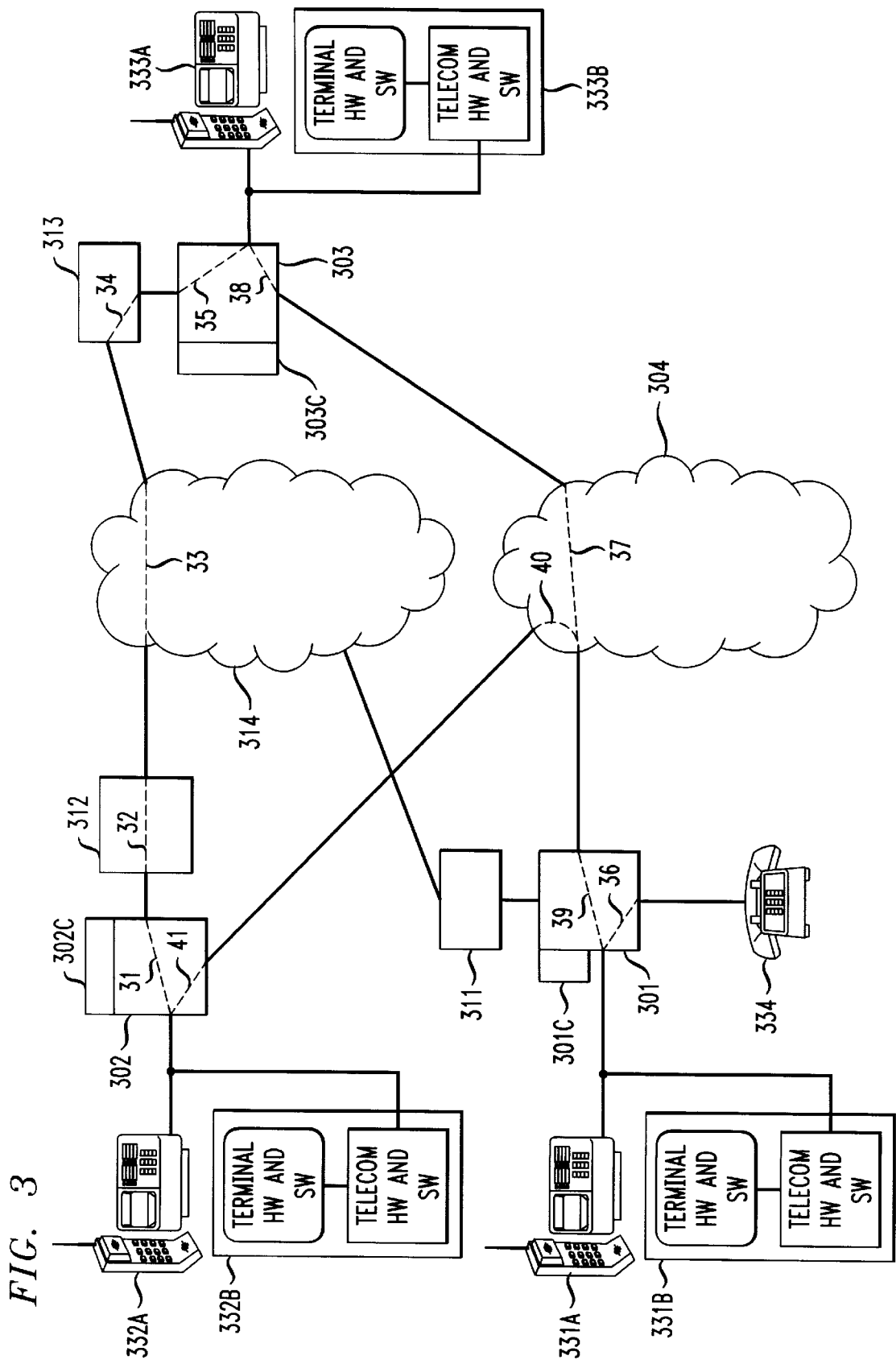
FIG. 3 illustrates in block diagram form the architecture of a typical communications network that is equipped with the call hold state notification system and that is connected to an Internet Service Provider communications network.
Figure 4:
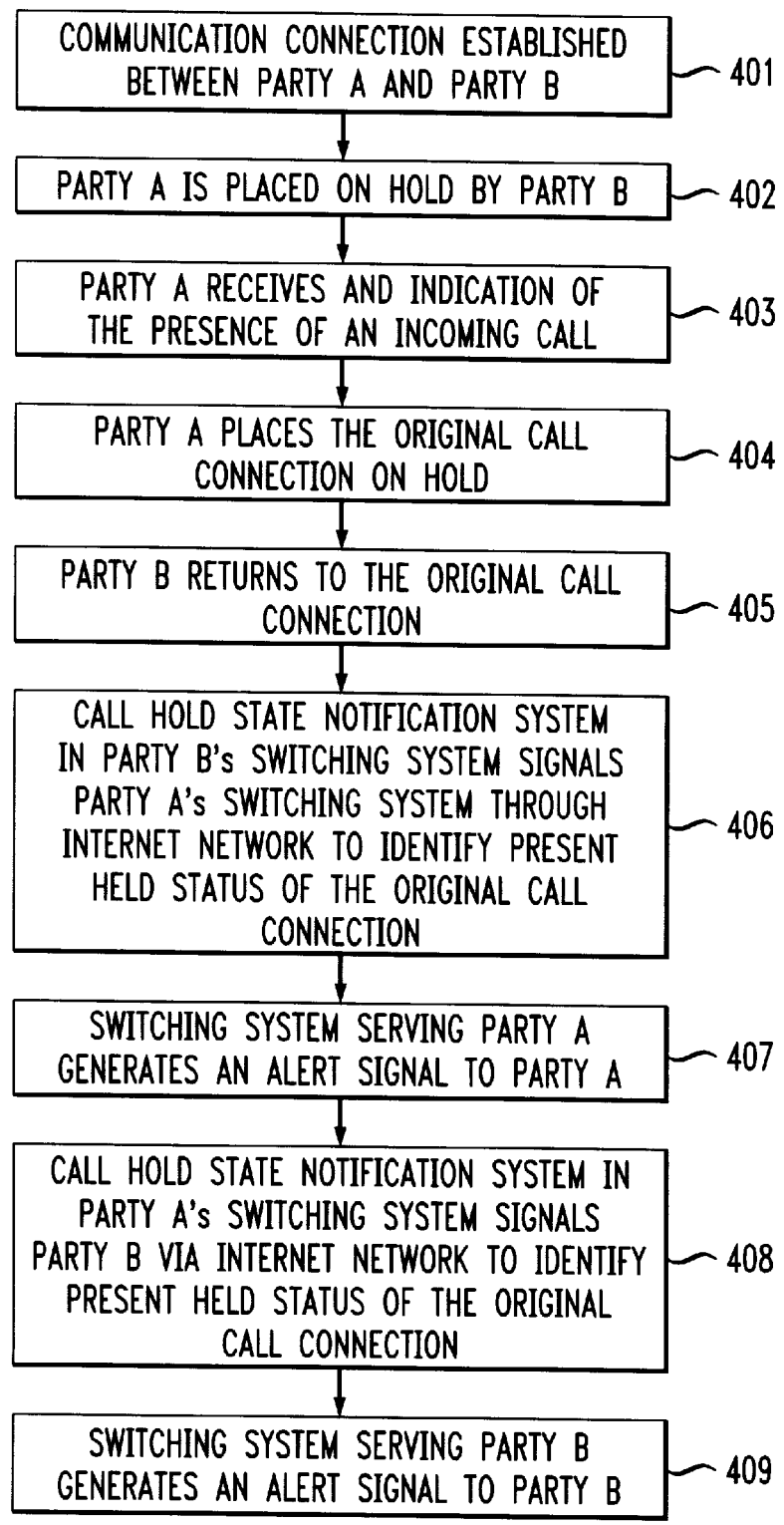
FIG. 4 illustrates in flow diagram form the operation of the present call hold state notification system in a typical communications network that is equipped with the call hold state notification system and that is connected to an Internet Service Provider communications network.

FIG. 3 illustrates in block diagram form the architecture of a typical combination of a Public Switched Telephone Network (PSTN) and an Internet Service Provider communications network that is equipped with the present call hold state notification system while FIG. 4 illustrates in flow diagram form the operation of the present call hold state notification system in that communications network. In particular, the communications network comprises a traditional voice communications network that includes a plurality of communications systems 301–303, such as the local communications systems that are part of the Public Switched Telephone Network (PSTN) and are interconnected via trunk circuits to an Interexchange Carrier System (IXC) 304. Each of the communications systems 301–303 serve a plurality of telephone stations and the communications systems 301–303 may be interconnected via an out of band signaling link CS through the Interexchange Carrier System (IXC) 304, using the well known SS7 signaling protocol. The operation of such a communications network is well known and is not described in detail herein. The communications systems 301–303 provide a set of features and services to the terminal devices that they serve, including a call hold service wherein the communications systems 301–303 implement the call hold function for the associated terminal devices in response to control signals that are received from the terminal devices. In addition, the communications systems 301–303 are all equipped with the call hold state notification systems, that are operational in the controllers 301C–303C of the respective communications systems 301–303, as described above. The Internet Service Provider communications network comprises a data communications network 314 that interconnects a plurality of Internet Service Providers 311–313, each of which serves a plurality of subscribers. The subscribers are connected to the Internet Service Providers 311–313 via local communications systems 301–303 in well known fashion.

The subscriber at one of the terminal devices 332A, equipped with a personal computer 332B, can place a telephone call to another subscriber, at terminal device 333A, equipped with a personal computer 333B, via the Internet data communications network. This enables the subscriber to place a local telephone call through the local communications system 302 to the Internet Service Provider 312 and thence, without paying long distance toll charges, to the other subscriber. Thus, the Internet data communications network 314 performs the function of the Interexchange carrier 304.

Call Hold Notification Example

In order to illustrate the operation of the present call hold state notification system, an example of a typical call connection is described, in flow diagram form in FIG. 4, with respect to the system architecture of FIG. 3.

In particular, at step 401, a communication connection is established between Party A, located at terminal device 332A, and Party B, located at terminal device 333A. This is accomplished for example by Party A at terminal device 332A going "off hook" and dialing the telephone number of the Internet Service Provider via the telcom hardware and software that is resident in Party A's personal computer 332B. In response to the dialed digits, the controller 302C of communications system 302 causes a call connection to be extended over path 31 to the Internet Service Provider System 312, which, in response to control signals received from Party A via personal computer 332B that identify Party B located at terminal device 333A, extends this call connection over path 32 to data communications network 314. This communication connection is advanced by data communications network 314 over path 33 to Internet Service Provider System 313. Internet Service Provider extends this call connection over path 34 by initiating a call connection to communications system 303, where path 35 completes the call connection to the terminal device 333A and personal computer 333B of Party B, or, if there is an existing data communication link between personal computer 333B and Internet Service Provider 313, Internet Service Provider 313 extend the call connection to personal computer 333B via this existing link.

During this call connection, Party A is placed on hold by Party B at step 402 so that Party. B can receive another telephone call from, for example Party D, located at terminal device 334, over path 36–38. This is accomplished by Party B operating terminal device 333A (or an equivalent functionality in personal computer 333B) to signal controller 303C of communications system 303 (or the Internet service provider) to activate the call hold function. The controller 303C implements the call hold function, placing the call connection from terminal device 332A over paths 31–34 in an active but noncommunicating condition, thereby freeing terminal device 333A to originate and receive additional call connections. As part of this operation, communications system 303 must either maintain the call connection in a manner to prevent the call connection from being dropped by Internet Service Provider 313, or communicate with Internet Service Provider 313 to enable the data communication connection to Party A to be reestablished when necessary.

Assume that a new incoming telephone call (path segments 39–41) is received by Party A from Party C, located at terminal device 331A and Party A wishes to answer the incoming call while still on hold on the original call connection. To receive the incoming call from Party C, Party A at step 404 activates terminal device 332A to signal the controller 302C of communications system 302 (or the Internet service provider) to place the original call connection with Party B on hold (as described above) and thereby enable Party A to answer the incoming call from Party C. As a result, the original call connection between Party A and Party B is in an on hold state in both communications systems 302–303 that serve Party A and Party B, respectively.

If Party A is placed on hold by Party B, and subsequently Party A places their end of the original call connection on hold, Party B can optionally be notified. This enables Party B to continue with their second communication connection, knowing that Party A is not waiting for them. When either Party returns to the original call connection, a notification to the other Party or Parties to the call connection should be provided, indicating that a Party that was on hold has returned to the call connection and is available to continue with the communications.

When Party B returns to the original call connection at step 406 by operating terminal device 333A to signal controller 303C (or the Internet service provider) to release the call hold condition on the original call connection and restore the connection to terminal device 332A via path 31–35, Party A is not present because Party A is communicating with Party C on the second call connection. In order to make Party A aware of the return of Party B to the original call connection, the call hold state notification system located in communications system 303 (or the Internet service provider) at step 407 generates an alert signal to identify the present held status of the original call connection. In particular, the communications system 303 that serves Party B activates the call hold state notification system to transmit an indication to the controller 302C of communications system 302 (or the Internet service provider) that serves Party A to indicate the return to the original call connection by Party B. The controller 302C of communications system 302 serving Party A, in response of receipt of this indication from the call hold state notification system, generates an alert signal at step 408 and transmits it to communication system 302 at step 409 to identify the present call hold status of the original call connection. The communication system 302 at step 410 generates an alert to Party B to indicate theat Party A has reconnected to the original call connection. The message exchange between the two communications systems 302, 303 is accomplished by signaling through the Internet data connection, from communications system 303 to Internet Service Provider 313, via data communication network 314 to Internet Service Provider 312 to communications system 302.

If the Party A is equipped with a feature rich communications device 332A, then there are a number of call handling options that are available at this juncture. Party A may drop the call connection to Party C and return to the original call connection with party B. Alternatively, Party A can place the call connection with Party C on hold, while returning to the original call connection with Party B. Party A can also drop or conference the call connection with Party B or can send the call connection to a message system, such as voice mail. These options enable Party A to manage the call connection in response to changing circumstances occasioned by the receipt of the new call connection from Party C.

In the processing of the change of hold state of the call connection by Party B, the call hold state notification system resident in the controller 302C of communications system 302 can produce an indication that can be provided to Party B when Party B returns to the original call connection to indicate that Party A has placed the original call connection on hold. This is accomplished by the call hold state notification system resident in communications system 302, in response to the indication received from call hold state notification system of communications system 303 that Party B has reconnected to the original call connection, broadcasting a prerecorded message on the original call connection to Party B to inform Party B of the present hold state of the original call connection due to Party A's actions. At the conclusion of the prerecorded message, Party B can be presented with a number of options: remain on hold, camp-on, redirect to a message service, redirect to an attendant.

Additional Feature Capabilities

In the system described above, additional capabilities can be provided to enable the customers to vary the basic service packeage described above. Some of these variations include Hold Interrupt, wherein a party that was placed on hold can remove the remote hold condition from the call connection. An example of such a capability is where the call originating party hss placed the call connection on hold and then reurns to the call connection to discover that they have been placed on hold. In response to the indication of the hold state, this party can be provided with the option to respond by bridging or breaking into the call connection hold state that the other called party has established so that the original two parties to the call connection can communicate. Another variation of the above noted call hold notification process is to immediately provide the call originating party with an indication that the held called party has in turn placed the call connection on hold. Alternatively, the call originating party can be provided with a feature that if their held call is in turn placed on hold by the held called party, the original call connection is automatically dropped, either immediately or after a predetermined wait period. As with these examples, the noted service can be provided not only to the call originating party but also to the called party or in an n-way conference to all or selected conferees.

SUMMARY

The call hold state notification system enables both parties (multiple parties on a n-way call) to a call connection to place their respective call termination on hold to serve another call or to perform some other task without having to physically monitor the call connection. When any party to the call connection removes the hold state at their respective terminal device, the remaining parties to the call connection who have a hold state active at their termination receive a notification of the reconnection of the party to the call connection. This system described above is directly extensible to multiple party calls and the call connections can comprise multi-media communication connections.

What is claimed:

1. A system for call hold state notification operational in a communications network, that enables each party to a call connection to place the call connection in a hold state, comprising:

means for determining the on-hold status of an existing call connection; and means, responsive to a party to said call connection removing their on-hold state, for generating an indication of said party removing said on-hold state of said call connection, wherein said call connection spans at least two communications systems of said communications network, said means for generating comprises:

means, located in a communications system in said communications network that serves said party, for transmitting said generated indication to communications systems in said communications network that serve remaining parties to said call connection.

2. The system for call hold state notification of claim 1 wherein said means for generating further comprises:

means, located in said communications system in said communications network that serves said remaining parties, for delivering an indication to said remaining parties that said party has removed said on-hold state of said call connection.

3. The system for call hold state notification of claim 2 further comprising:

means, located in said communications system in said communications network that serves said remaining parties, responsive to one of said remaining parties having placed said call connection in an on-hold state, for delivering an indication to said party of the on-hold state of said call connection by said one of said remaining parties.

4. A system for call hold state notification operational in a communications network, that enables each party to a call connection to place the call connection in a hold state, comprising:

means for determining the on-hold status of an existing call connection;

means, responsive to a party to said call connection removing their on-hold state. for generating an indication of said party removing said on-hold state of said call connection; wherein said call connection spans at least two communications systems of said communications network and an Internet data communications network, said means for generating comprises:

means, located in a communications system in said communications network that serves said party, for generating an indication of said party removing said on-hold state of said call connection; and means for transmitting said generated indication via said Internet data communications network to a communications system in said communications network that serves remaining parties to said call connection.

5. The system for call hold state notification of claim 4 wherein said means for generating further comprises:

means, located in said communications system in said communications network that serves said remaining parties, for delivering an indication to said remaining parties that said party has removed said on-hold state of said call connection.

6. The system for call hold state notification of claim 5 further comprising:

means, located in said communications system in said communications network that serves said remaining parties, responsive to one of said remaining parties having placed said call connection in an on-hold state, for delivering an indication to said party of the on-hold state of said call connection by said one of said remaining parties.

7. The system for call hold state notification of claim 4 further comprising:

means, located in said Internet data communications, for delivering an indication to said remaining parties that said party has removed said on-hold state of said call connection.

8. A system for call hold state notification operational in a communications network, that enables each party to a call connection to place the call connection in a hold state, comprising:

means for determining the on-hold status of an existing call connection;

means, responsive to a party to said call connection removing their on-hold state, for generating an indication of said party removing said on-hold state of said call connection; wherein said call connection spans at least two communications systems of said communications network and an Internet data communications network, said means for generating comprises:

means, located in said Internet data communications network, for generating an indication of said party removing said on-hold state of said call connection; and means for transmitting said generated indication via said Internet data communications network to a communications system in said communications network that serves remaining parties to said call connection.

9. A method of operating a system for call hold state notification that is operational in a communications network, that enables each party to a call connection to place the call connection in a hold state, comprising the steps of:

determining the on-hold status of an existing call connection; and generating, in response to a party to said call connection removing their on-hold state, an indication of said party removing said on-hold state of said call connection, wherein said call connection spans at least two communications systems of said communications network, said step of generating comprises:

transmitting from a communications system in said communications network that serves said party, said generated indication to communications systems in said communications network that serve remaining parties to said call connection.

10. The method of operating a system for call hold state notification of claim 9 further comprising the step of:

delivering from said communications system in said communications network that serves one of said remaining parties, in response to said one of said remaining parties having placed said call connection in an on-hold state, an indication to said party of the on-hold state of said call connection by said one of said remaining parties.

11. The method of operating a system for call hold state notification of claim 9 wherein said call connection is extant in a single communications system in said communications network, said step of generating comprises:

generating in a communications system, an indication of said party removing said on-hold state of said call connection.

12. A method of operating a system for call hold state notification that is operational in a communications network, that enables each party to a call connection to place the call connection in a hold state, comprising the steps of:

determining the on-hold status of an existing call connection;

generating, in response to a party to said call connection removing their on-hold state, an indication of said party removing said on-hold state of said call connection;

wherein said call connection spans at least two communications systems of said communications network and an Internet data communications network, said step of generating comprises:

generating, in a communications system in said communications network that serves said party, an indication of said party removing said on-hold state of said call connection; and transmitting said generated indication via said Internet data communications network to a communications system in said communications network that serves remaining parties to said call connection.

13. The method of operating a system for call hold state notification of claim 12 wherein said step of generating further comprises:

delivering from said communications system in said communications network that serves said one of said remaining parties, an indication to said one of said remaining parties that said party has removed said on-hold state of said call connection.

14. The method of operating a system for call hold state notification of claim 13 further comprising the step of:

delivering from said communications system in said communications network that serves said one of said remaining parties, in response to said one of said remaining parties having placed said call connection in an on-hold state, an indication to said party of the on-hold state of said call connection by said one of said remaining parties.

15. The method of operating a system for call hold state notification of claim 12 further comprising the step of:

delivering from said Internet data communications, an indication to said remaining parties that said party has removed said on-hold state of said call connection.

16. A method of operating a system for call hold state notification that is operational in a communications network, that enables each party to a call connection to place the call connection in a hold state, comprising the steps of:

determining the on-hold status of an existing call connection;

generating, in response to a party to said call connection removing their on-hold state, an indication of said party removing said on-hold state of said call connection;

wherein said call connection spans at least two communications systems of said communications network and an Internet data communications network, said step of generating comprises:

generating in said Internet data communications network, an indication of said party removing said on-hold state of said call connection; and transmitting said generated indication via said Internet data communications network to a communications system in said communications network that serves remaining parties to said call connection.

\* \* \* \* \*